United States Patent
Keebler et al.

(10) Patent No.: US 8,713,968 B2
(45) Date of Patent: May 6, 2014

(54) METHOD AND APPARATUS FOR MAKING A 3D GLASS ARTICLE

(75) Inventors: Thomas A Keebler, Corning, NY (US); Robert Sabia, Corning, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 79 days.

(21) Appl. No.: 13/094,116

(22) Filed: Apr. 26, 2011

(65) Prior Publication Data

US 2011/0265517 A1 Nov. 3, 2011

Related U.S. Application Data

(60) Provisional application No. 61/330,632, filed on May 3, 2010.

(51) Int. Cl.
*C03B 23/023* (2006.01)
*C03B 23/26* (2006.01)

(52) U.S. Cl.
CPC .............. *C03B 23/023* (2013.01); *C03B 23/26* (2013.01)
USPC ................................................ 65/106; 65/61

(58) Field of Classification Search
USPC ...................... 65/61, 106, 287, 323
See application file for complete search history.

(56) References Cited

U.S. PATENT DOCUMENTS

| | | | |
|---|---|---|---|
| 4,441,795 A * | 4/1984 | Lobdell | .................... 351/159.41 |
| 4,666,493 A | 5/1987 | Frank et al. | |
| 5,674,790 A | 10/1997 | Araujo | |
| 7,125,117 B2 | 10/2006 | Chansavoir et al. | |
| 7,326,373 B2 * | 2/2008 | Sidhu et al. | ................... 264/1.31 |
| 7,666,511 B2 | 2/2010 | Ellison et al. | |
| 2004/0206123 A1 | 10/2004 | Fotheringham et al. | |
| 2009/0117332 A1 * | 5/2009 | Ellsworth et al. | ............. 428/156 |
| 2009/0142568 A1 | 6/2009 | Dejneka et al. | |
| 2009/0215607 A1 | 8/2009 | Dejneka et al. | |
| 2009/0220761 A1 | 9/2009 | Dejneka et al. | |
| 2009/0258187 A1 * | 10/2009 | Brady et al. | ................... 428/131 |
| 2010/0000259 A1 | 1/2010 | Ukrainczyk et al. | |

(Continued)

FOREIGN PATENT DOCUMENTS

| | | |
|---|---|---|
| EP | 1050898 A2 | 11/2000 |
| EP | 2119679 A1 | 5/2008 |
| JP | 57142620 A * | 9/1982 |
| JP | 2001-83492 A1 | 3/2001 |

OTHER PUBLICATIONS

EPO Patent Abstract of JP 2001083492.

(Continued)

*Primary Examiner* — Matthew Daniels
*Assistant Examiner* — Cynthia Szewczyk
(74) *Attorney, Agent, or Firm* — Timothy M. Schaeberle

(57) ABSTRACT

A method of making a 3D glass article includes forming at least one marker on an edge of a 2D glass piece. The 2D glass piece is thermally reformed into a 3D glass article, where the at least one marker formed on the edge of the 2D glass piece is carried over to an edge of the 3D glass article. The 3D glass article is aligned on a support using the at least one marker on the edge of the 3D glass article. Then, the edge of the 3D glass article is finished to a final shape and dimension.

12 Claims, 2 Drawing Sheets

(56) References Cited

U.S. PATENT DOCUMENTS

2010/0035038 A1   2/2010   Barefoot et al.
2011/0126588 A1*  6/2011   Malach et al. ................. 65/30.1

OTHER PUBLICATIONS

U.S. Appl. No. 61/264,915, filed Nov. 30, 2009 titled "Method and Apparatus for Making a Shaped Glass Article".

* cited by examiner

METHOD AND APPARATUS FOR MAKING A 3D GLASS ARTICLE

CROSS-REFERENCE TO RELATED APPLICATIONS

This application claims benefit of U.S. Provisional Application No. 61/330,632, filed 3 May 2010.

BACKGROUND

1. Technical Field

The invention relates to methods and apparatus for making three-dimensional (3D) shapes. More specifically, the invention relates to a method and apparatus for forming a 3D glass article.

2. Description of Related Art

Use of 3D glass covers for mobile display devices is on the rise. The glass covers are required to be highly precise in dimension and in the location of the 3D curvature relative to their outer peripheries. Typical dimensional tolerances are ±30 µm to ±50 µm. Consistent dimension is required for mounting the glass cover into a prescribed bevel in a display device without leaving unwanted, visible gaps between the bevel and glass cover. Centering of the contour of the glass cover relative to the display and touch screen is required for aesthetics and function.

The 3D glass cover can be made by thermally reforming a two-dimensional (2D) glass sheet into a 3D shape. To achieve the desired tolerances, such as those mentioned above, for some 3D shapes, it may be necessary to finish the edges of the 3D glass shape after the reforming process. However, edge-finishing requires precise alignment of the 3D glass shape on a computed numerically controlled (CNC) machine tool. A laser-based scanning vision system could be used to locate the center of the 3D glass shape, and the located center could then be used as a reference for alignment of the 3D glass shape on the CNC machine tool. However, laser-based scanning vision systems are costly, and scanning can be time consuming. The scanning of glass also requires specific lighting conditions since reflections such as those from a vacuum chuck used to hold the glass on the CNC machine tool can interfere with scanning For high-volume manufacturing, it is desirable to have a robust, low-cost setup that allows for the 3D glass shape to be positioned accurately and quickly in a repeatable manner on a CNC machine tool.

The alternative to thermally reforming a glass sheet into a 3D glass shape and then edge-finishing the 3D glass shape is to fully machine the 3D glass cover via a grind and polish process. This alternative concept has been industrialized in hand-held mobile devices such as media players. Because of the need to perform display-quality polishing to the ground glass surface and tool limitations for performing such polishing to the required quality, design options with this alternative approach are limited to shapes that can be made with a small amount of material removal and shapes with simplistic cylindrical and spherical convex shapes. However, industrial design groups for mobile devices desire glass cover surfaces with complex, non-cylindrical and non-spherical surfaces, which are not possible via a pure grind and polish process. This leaves the thermal reforming process as the more viable process for forming complex glass covers and the necessity to solve the problem of inadequate precision or difficulty in achieving a desired edge geometry associated with use of thermal reforming to make 3D shapes.

SUMMARY

In one aspect of the invention, a method of making a 3D glass article comprises forming at least one marker on an edge of a 2D glass piece (step a), thermally reforming the 2D glass piece into a 3D glass article, wherein the at least one marker formed on the edge of the 2D glass piece is carried over to an edge of the 3D glass article (step b), aligning the 3D glass article on a support using the at least one marker on the edge of the 3D glass article (step c), and finishing the edge of the 3D glass article to a final shape and dimension (step d).

In one embodiment, in step (a), the at least one marker is a notch. In one embodiment, step (d) includes contacting an alignment pin on the support with the notch. In one embodiment, the notch has a radius of curvature that is larger than a radius of the alignment pin.

In one embodiment, the method further includes annealing the 3D glass article prior to step (c).

In one embodiment, the method further includes subjecting the 3D glass article to an ion-exchange process after step (d).

In one embodiment, the 3D glass article formed in step (b) has two opposing curved surfaces. In one embodiment, the method further includes planarizing one of the curved surfaces prior to step (d) to form a plano-curved 3D glass article.

In one embodiment, step (d) includes forming one or more features in the 3D glass article.

In one embodiment, step (d) includes at least one of grinding, lapping, and polishing the edge of the 3D glass article.

In one embodiment, the method further includes cutting the 2D glass piece from a larger 2D glass sheet prior to step (a).

In one embodiment, step (b) includes aligning the 2D glass piece on a mold using the at least one marker formed on the edge of the 2D glass piece. In one embodiment, aligning the 2D glass piece on the mold comprises contacting an alignment pin on the mold with the at least one marker formed on the edge of the 2D glass piece. In one embodiment, the at least one marker formed on the edge of the 2D glass piece is a notch. In one embodiment, the notch has a radius of curvature that is larger than a radius of the alignment pin on the mold.

It is to be understood that both the foregoing general description and the following detailed description are exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Additional features and advantages of the invention will be set forth in the detailed description that follows and, in part, will be readily apparent to those skilled in the art from that description or recognized by practicing the invention as described herein.

In one aspect, the invention provides a method for making a 3D glass article with a complex surface at a low cost and with precise dimensions. The method is particularly useful for forming 3D glass covers with non-cylindrical and non-spherical convex or concave surfaces. The 3D glass covers formed by the method can be mounted on prescribed areas of display devices without leaving unwanted visible gaps between the display devices and glass covers. The 3D glass covers can be precisely made so that there will be no need to fill a gap between the 3D glass covers and the display devices with adhesive. The method has two main parts. The first part is to thermally reform a glass sheet into a desired 3D shape. The second part is to use a CNC machine tool to machine the 3D shape into the required final dimension. Markers are formed on the glass sheet during the first part of the method to facilitate alignment of the 3D shape in the CNC machine tool, thereby avoiding a need for a costly laser-based scanning vision system.

Figure 1:
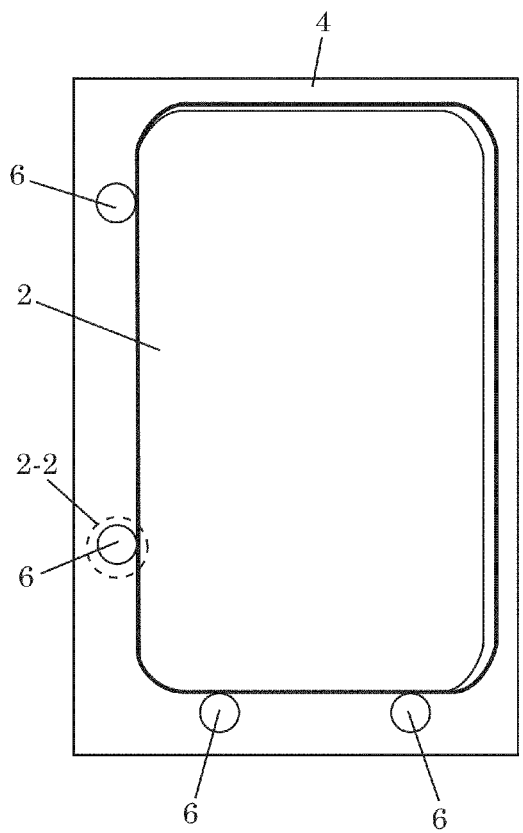
FIG. 1 is a top view of a 2D glass piece placed on a mold.
Figure 2:
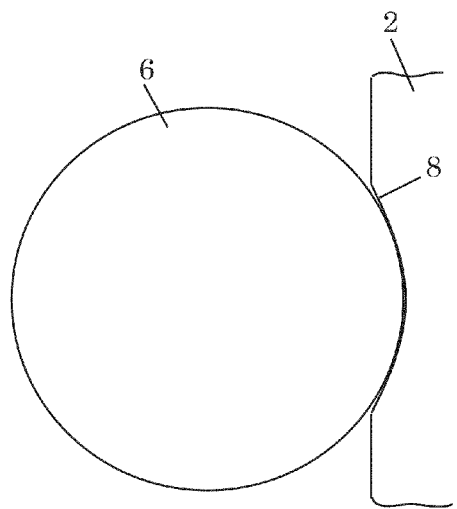
FIG. 2 is an enlargement of the circle 2-2 of FIG. 1 and shows an alignment pin in contact with a notch formed at an edge of the 2D glass piece.

A 3D glass article made by a process according to one embodiment of the invention has a front surface and a back surface (the term "front" and "back" are used arbitrarily). Both the front surface and back surface are curved. The front and back surfaces can be selected from cylindrical, non-cylindrical, spherical, and non-spherical surfaces. To form the 3D glass article, a 2D glass piece is cut from a larger two-dimensional (2D) glass sheet. The larger 2D glass sheet may be made by any suitable process, e.g., fusion draw or float process. Fusion-drawn glass sheets are characterized by pristine surfaces and are preferred. The 2D glass piece may be cut by any suitable process, such as laser scoring. Markers are formed on the edge of the 2D glass piece. For example, the markers may be notches formed on the edge of the 2D glass piece using, for example, a CNC machine tool. The 2D glass piece is oversized so that the edge can be trimmed later to remove the notches, i.e., the notches will not appear in the final 3D glass article. The 2D glass piece with the notches (or markers) is placed on a mold. Alignment pins are used to align the 2D glass piece on the mold. Corner alignment with a tilted mold, as described in U.S. Provisional Application No. 61/264,915, filed 30 Nov. 2009, the disclosure of which is incorporated herein by reference, can be used to align the 2D glass piece on the mold without over-constraining the 2D glass piece. The same alignment features will be transferred from the mold onto the CNC machine tool chuck, as will be further explained below. FIG. 1 shows a top view of a 2D glass piece 2 on a mold 4, with the alignment pins 6 on the mold 4 in contact with the notches (8 in FIG. 2) at the edge of the 2D glass piece 2. FIG. 2 is a close-up view of circled region 2-2 in FIG. 1 and shows an alignment pin 6 in contact with a notch 8. The notch 8 is curved with a radius of curvature that is slightly larger than the radius of the alignment pin 6 to allow for point contact between the notch 8 and the alignment pin 6.

After alignment of the 2D glass piece on the mold, the 2D glass piece is thermally reformed into a 3D glass article. Thermal reforming includes heating the 2D glass piece and the mold. Heating is preferably done preferentially and rapidly by radiation as described in U.S. patent application Ser. No. 12/493,674, filed on 29 Jun. 2009, the disclosure of which is incorporated herein by reference (this application is available under U.S. Patent Application Publication No. US 2010/0000259 A1 of 7 Jan. 2010 by Ukrainczyk et al.). Mid-infrared heaters may be used for the heating. The preferential heating is such that the mold remains substantially colder than the 2D glass piece during the heating. For a tilted mold, as taught in U.S. Provisional Application No. 61/264,915, the heater may be arranged so that it directs heat to the 2D glass piece along a substantially normal direction to the 2D glass piece. In one embodiment, thermal reforming further includes sagging the heated 2D glass piece onto a contoured surface of the mold so that the 2D glass piece assumes the profile of the contoured surface of the mold, thereby forming a 3D glass article. The 2D glass piece is preferably at a forming temperature when the 2D glass piece is being sagged onto the contoured surface of the mold. The forming temperature may be between the softening point and the annealing point of the glass or may be a temperature at which the glass viscosity is in a range from $10^7$ P to $10^{11}$ P. During sagging of the 2D glass piece, the alignment pins maintain edge alignment of the 2D glass piece to the mold cavity. Sagging of the 2D glass piece may be assisted by vacuum, wherein vacuum is applied to the mold cavity to draw the 2D glass piece against the contoured surface of the mold. Thermal reforming is not limited to sagging of the 2D glass piece onto the contoured surface of the mold. In another embodiment, thermal reforming may be by pressing the 2D glass piece into a mold by a shaped plunger. A combination of sagging and pressing may also be used to shape the 2D glass piece into a 3D glass article.

Figure 3:
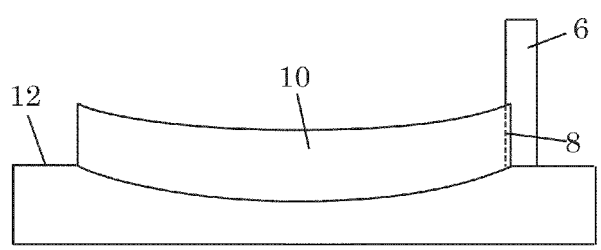
FIG. 3 shows a 3D glass article aligned in a chuck for edge-finishing.

The 3D glass article is cooled down while sitting in the mold. Cooling may be by exposing the mold to ambient air or by circulating cooling air or gas around the mold and the 3D glass article. The 3D glass article may be cooled to a temperature below its annealing point or strain point. After cooling, the 3D glass article is removed from the mold. The 3D glass article is then annealed. After annealing, the 3D glass article is placed on a support, e.g., a vacuum chuck, of a CNC machine tool. The vacuum chuck or support holds the 3D glass article while the 3D glass is worked on by the machine tool. The 3D glass article is precisely aligned on the chuck (or support) by means of the alignment pins and notches, as in the case of aligning the 2D glass piece on the mold. FIG. 3, for example, shows a 3D glass article 10 mounted on a vacuum chuck 12, with an alignment pin 6 on the vacuum chuck 12 in contact with a notch 8 at an edge of the 3D glass article 10. One or more alignment pins may be used to align the 3D glass article on the chuck. Once the 3D glass article is aligned on the chuck and secured to the chuck, e.g., by vacuum, the alignment pin(s) can be removed from the notch(es) and chuck. The edge of the 3D glass article is finished to the final shape and dimension using the CNC machine tool. Other features, such as holes and slots, may also be machined into the 3D glass article as needed while the 3D glass article is held on the chuck. The notches (or markers) at the edge of the 3D glass article will be removed during the edge-finishing. However, this is not a problem since the notches (or markers) will no longer be needed after precise placement of the 3D glass article on the chuck using the notches (or markers) and alignment pins, as described above.

Following the edge-finishing, the 3D glass article can be removed from the chuck and subjected to an ion-exchange process. The purpose of the ion-exchange process is to strengthen the 3D glass article. For this purpose, the 3D glass article should be made of an ion-exchangeable glass. Ion-exchangeable glasses are alkali-containing glasses with smaller alkali ions, such as $Li^+$ and/or $Na^+$, that can be exchanged for larger alkali ions, e.g., K+, during an ion-exchange process. Examples of suitable ion-exchangeable glasses are described in U.S. Pat. No. 7,666,511 and U.S. Patent Publication Nos. 2009-0142568, 2009-0215607, 2009-0220761, and 2010-0035038, U.S. Provisional Application Nos. 61/235,767 and 61/235,762 (all assigned to Corning Incorporated), the contents of which are incorporated herein by reference. These glasses can be ion-exchanged at relatively low temperatures and to a depth of at least 30 μm. A process for strengthening glass by ion-exchange is described in, for example, U.S. Pat. No. 5,674,790 (Araujo, Roger J.). The ion-exchange process typically occurs at an elevated temperature range that does not exceed the transition temperature of the glass. The process is carried out by immersing the glass in a molten bath containing an alkali salt (typically a nitrate) with ions that are larger than that of the host alkali ions in the glass. The host alkali ions are exchanged for the larger alkali ions. For example, a glass containing $Na^+$ may be immersed in a bath of molten potassium nitrate ($KNO_3$). The larger $K^+$ present in the molten bath will replace the smaller $Na^+$ in the glass. The presence of the larger alkali ions at sites formerly occupied by small alkali ions creates a compressive stress at or near the surface of the glass and tension in the interior of the glass. The glass is removed from the molten bath and cooled down after the ion-exchange process. The ion-exchange depth, i.e., the penetration depth of the invading larger alkali ions into the glass, is typically on the order of 40 μm to 300 μm and is controlled by the glass composition and immersion time. When the ion-exchange process is properly executed, a scratch-resistant glass surface can be formed.

Figure 4:
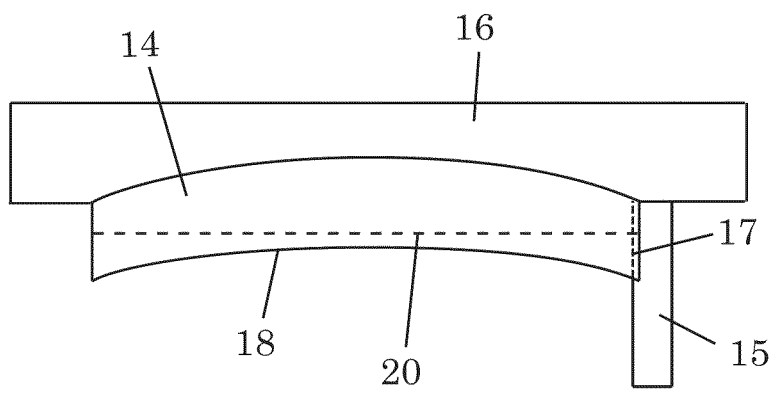
FIG. 4 shows a 3D glass article aligned in a chuck for planarizing.
Figure 5:
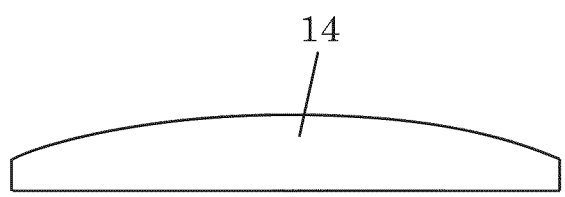
FIG. 5 shows a plano-convex 3D glass article.

A 3D glass article made by a process according to another embodiment of the invention has a front surface that is curved and a back surface that is planar (the term "front" and "back" are used arbitrarily). The front surface can be selected from cylindrical, non-cylindrical, spherical, and non-spherical surfaces. The process for making the 3D glass article with the curved front surface and planar back surface includes all the steps described above for making the 3D glass article with the curved front surface and curved back surface and an additional step of planarizing a curved surface. Above, a step of thermally forming a 2D glass piece into a 3D glass article was described. After thermal forming, the 3D glass article has two opposing curved surfaces. To form the 3D glass article having a curved front surface and a planar back surface, one of the two opposing curved surfaces will have to be planarized. The planarizing may take place after annealing. The planarizing step includes placing the 3D glass article with the two opposing curved surfaces on a support with the aid of alignment pins at the notch locations, as described for aligning the 2D glass piece on the mold above. One of the curved surfaces of the 3D glass article is then planarized by a suitable combination of grinding, lapping, and polishing. Grinding is a fixed abrasive process, while lapping and polishing are loose abrasive processes. Grinding can be used for fast removal of material, followed by lapping to even out the ground surface, and then polishing to smoothen the lapped surface. For the grinding process, the 3D glass article can be placed in a vacuum chuck. For illustration purposes, FIG. 4 shows a 3D glass article 14 in a vacuum chuck 16 contoured to receive the 3D glass article. The 3D glass article 14 is aligned in the vacuum chuck 16 by means of alignment pins 15 on the vacuum chuck. The alignment pins 15 engage the notches 17 at the edge of the 3D glass article 14 (the notches are carried over from the 2D glass piece shaped into the 3D glass article, as described above). Once the 3D glass article 14 is held in place by vacuum, the alignment pins 15 can be removed from the notches 17 and vacuum chuck 16. Then, the curved surface 18 of the 3D glass article 14 can be planarized, e.g., to the dotted line 20, via any suitable combination of grinding, lapping, and polishing. A different carrier than a vacuum chuck 16 may be needed during lapping and polishing. FIG. 5 shows the 3D glass article 14 after planarizing. Now, the 3D glass article 14 has a plano-convex shape. A 3D glass article having a plano-concave shape may be similarly made. After the planarizing step, the remainder of the process continues as described above for making a 3D glass article having a curved front surface and curved back surface.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of making a three-dimensional (3D) glass article, comprising:
   (a) forming by machining at least one notch on an edge of a two-dimensional (2D) glass piece;
   (a1) providing a mold having at least one alignment pin thereon at a select position to contact the at least one notch on the edge of the 2D glass piece and thereby align the 2D glass piece on the mold;
   (a2) aligning the 2D glass piece on the mold by contacting the at least one alignment pin on the mold with the at least one notch on the edge of the 2D glass piece;
   (b) after the aligning of step (a2) thermally reforming the 2D glass piece with the at least one notch on an edge thereof into a 3D glass article, wherein the at least one notch formed on the edge of the 2D glass piece is carried over to an edge of the 3D glass article;
   (c) aligning the 3D glass article on a support by contacting the at least one notch carried over to the edge of the 3D glass article with an alignment pin on the support;
   (d) finishing the edge of the 3D glass article to a final shape and dimension; and
   (e) between the aligning of step (c) and the finishing of step (d), securing the 3D glass article to the support and then removing the alignment pin from the at least one notch carried over to the edge of the 3D glass article.

2. The method of claim 1, wherein the at least one notch carried over to the edge of the 3D glass article has a radius of curvature that is larger than a radius of the alignment pin on the support.

3. The method of claim 1, further comprising annealing the 3D glass article prior to step (c).

4. The method of claim 1, further comprising subjecting the 3D glass article to an ion-exchange process after step (d).

5. The method of claim 1, wherein the 3D glass article formed in step (b) has two opposing curved surfaces.

6. The method of claim 5, further comprising planarizing one of the curved surfaces prior to step (d) to form a plano-curved 3D glass article.

7. The method of claim 1, further comprising forming one or more features selected from the group consisting of holes and slots in the 3D glass article while the 3D glass article is on the support.

8. The method of claim 1, wherein step (d) comprises at least one of grinding, lapping, and polishing the edge of the 3D glass article.

9. The method of claim 1, further comprising cutting the 2D glass piece from a larger glass sheet prior to step (a).

10. The method of claim 1, wherein the at least one notch has a radius of curvature that is larger than a radius of the at least one alignment pin on the mold.

11. The method of claim 1, wherein securing the 3D glass article to the support is by means of vacuum.

12. The method of claim 1, wherein the finishing of step (d) comprises removing the at least one notch carried over to the edge of the 3D glass article from the 3D glass article.

* * * * *